(12) United States Patent
Tsuria et al.

(10) Patent No.: US 8,347,106 B2
(45) Date of Patent: Jan. 1, 2013

(54) METHOD AND APPARATUS FOR USER AUTHENTICATION BASED ON A USER EYE CHARACTERISTIC

(75) Inventors: Yossi Tsuria, Jerusalem (IL); Stephanie Wald, Givat Ze'ev (IL); Aviad Kipnis, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 410 days.

(21) Appl. No.: 12/452,262

(22) PCT Filed: Jan. 21, 2008

(86) PCT No.: PCT/IB2008/050208
§ 371 (c)(1),
(2), (4) Date: Jan. 26, 2010

(87) PCT Pub. No.: WO2009/004498
PCT Pub. Date: Jan. 8, 2009

(65) Prior Publication Data
US 2010/0138668 A1 Jun. 3, 2010

(30) Foreign Application Priority Data
Jul. 3, 2007 (IL) .......................................... 184399

(51) Int. Cl.
| | |
|---|---|
| G06F 21/00 | (2006.01) |
| G06F 7/04 | (2006.01) |
| G06F 15/16 | (2006.01) |
| G06F 17/30 | (2006.01) |
| G06F 12/14 | (2006.01) |
| G06F 13/00 | (2006.01) |
| G06K 9/00 | (2006.01) |
| H04L 9/00 | (2006.01) |
| H04L 29/06 | (2006.01) |
| G11C 7/00 | (2006.01) |

(52) U.S. Cl. .......... 713/186; 382/116; 382/117; 380/44; 340/5.83; 726/6; 726/7; 726/18; 726/19; 726/21

(58) Field of Classification Search ................... 713/186
See application file for complete search history.

(56) References Cited

U.S. PATENT DOCUMENTS
4,641,349 A * 2/1987 Flom et al. .................... 382/117
(Continued)

FOREIGN PATENT DOCUMENTS
WO   WO 99/33219   7/1999
(Continued)

OTHER PUBLICATIONS

Ulf Cahn Von Seelen "IRISCODE Template Compression and Its Effects on Authentication Performance" (excerpt) (www.biometrics.org/.../Mocrosoft%20PowerPoint%20-%20VonSeelenBrief_Update.ppt%20%5BRead-Only%5D.pdf).
(Continued)

*Primary Examiner* — Carolyn B Kosowski
(74) *Attorney, Agent, or Firm* — Husch Blackwell LLP

(57) ABSTRACT

An information delivery device interacting with a user's eye, the device comprising an eye characteristic reader for reading at least one characteristic of the user's eye, a retinal projector for projecting information onto the retina, and an eye characteristic processor operative to receive at least one characteristic of the eye and to select the information based at least partly thereupon. A content protection system may comprise a multiplicity of such eye characteristic readers and a content protector receiving said at least one characteristic from such readers and controlling the user population's use of content to be protected based on that at least one characteristic. Related apparatus and methods are also provided.

12 Claims, 3 Drawing Sheets

U.S. PATENT DOCUMENTS

| | | | |
|---|---|---|---|
| 5,291,560 A * | 3/1994 | Daugman | 382/117 |
| 5,726,671 A | 3/1998 | Ansley et al. | |
| 5,978,494 A * | 11/1999 | Zhang | 382/117 |
| 6,023,522 A * | 2/2000 | Draganoff et al. | 382/124 |
| 6,038,315 A | 3/2000 | Strait et al. | |
| 6,229,905 B1 * | 5/2001 | Suzaki | 382/110 |
| 6,332,193 B1 * | 12/2001 | Glass et al. | 713/170 |
| 6,363,485 B1 | 3/2002 | Adams et al. | |
| 6,542,624 B1 * | 4/2003 | Oda | 382/117 |
| 6,819,219 B1 * | 11/2004 | Bolle et al. | 340/5.52 |
| 6,957,337 B1 | 10/2005 | Chainer et al. | |
| 7,092,555 B2 * | 8/2006 | Lee et al. | 382/118 |
| 7,095,901 B2 * | 8/2006 | Lee et al. | 382/255 |
| 7,099,495 B2 * | 8/2006 | Kodno et al. | 382/117 |
| 7,130,452 B2 * | 10/2006 | Bolle et al. | 382/115 |
| 7,146,027 B2 * | 12/2006 | Kim et al. | 382/117 |
| 7,271,839 B2 * | 9/2007 | Lee et al. | 348/346 |
| 7,278,017 B2 * | 10/2007 | Skantze | 713/168 |
| 7,298,874 B2 * | 11/2007 | Cho | 382/118 |
| 7,346,195 B2 * | 3/2008 | Lauper et al. | 382/117 |
| 7,347,547 B2 * | 3/2008 | Sugita et al. | 351/205 |
| 7,369,759 B2 * | 5/2008 | Kusakari et al. | 396/18 |
| 7,440,592 B1 * | 10/2008 | Nimmer | 382/117 |
| 7,512,254 B2 * | 3/2009 | Vollkommer et al. | 382/115 |
| 7,564,993 B2 * | 7/2009 | Kondo et al. | 382/117 |
| 7,616,785 B2 * | 11/2009 | Kondo et al. | 382/117 |
| 7,630,524 B2 * | 12/2009 | Lauper et al. | 382/117 |
| 7,715,595 B2 * | 5/2010 | Kim et al. | 382/117 |
| 7,797,549 B2 * | 9/2010 | Main et al. | 713/186 |
| 7,801,335 B2 * | 9/2010 | Hanna et al. | 382/117 |
| 7,869,593 B2 * | 1/2011 | Beeson | 380/30 |
| 7,925,887 B2 * | 4/2011 | Burton | 713/186 |
| 7,957,722 B2 * | 6/2011 | Ritter | 455/411 |
| 7,986,816 B1 * | 7/2011 | Hoanca et al. | 382/115 |
| 8,090,246 B2 * | 1/2012 | Jelinek | 396/18 |
| 8,155,395 B2 * | 4/2012 | Kobayashi et al. | 382/117 |
| 8,156,562 B2 * | 4/2012 | Kawase et al. | 726/26 |
| 8,184,867 B2 * | 5/2012 | Otto et al. | 382/117 |
| 2001/0043208 A1 | 11/2001 | Furness, III et al. | |
| 2002/0056043 A1 * | 5/2002 | Glass | 713/179 |
| 2003/0089764 A1 * | 5/2003 | Meadow et al. | 235/375 |
| 2003/0091218 A1 | 5/2003 | Hamid | |
| 2003/0103652 A1 * | 6/2003 | Lee et al. | 382/118 |
| 2003/0169334 A1 * | 9/2003 | Braithwaite et al. | 348/78 |
| 2004/0061592 A1 * | 4/2004 | Smith et al. | 340/5.82 |
| 2004/0111625 A1 * | 6/2004 | Duffy et al. | 713/186 |
| 2004/0114782 A1 * | 6/2004 | Cho | 382/117 |
| 2005/0129286 A1 * | 6/2005 | Hekimian | 382/117 |
| 2006/0008125 A1 | 1/2006 | Lauper et al. | |
| 2006/0072793 A1 * | 4/2006 | Determan | 382/117 |
| 2006/0115130 A1 * | 6/2006 | Kozlay | 382/117 |
| 2006/0147095 A1 * | 7/2006 | Usher et al. | 382/117 |
| 2006/0282671 A1 * | 12/2006 | Burton | 713/176 |
| 2007/0025598 A1 * | 2/2007 | Kobayashi et al. | 382/117 |
| 2007/0052672 A1 * | 3/2007 | Ritter et al. | 345/156 |
| 2007/0074040 A1 * | 3/2007 | Lakshmeshwar | 713/186 |
| 2007/0172256 A1 * | 7/2007 | Iwamura | 399/130 |
| 2007/0241861 A1 * | 10/2007 | Venkatanna et al. | 340/5.52 |
| 2008/0137916 A1 * | 6/2008 | Lauper et al. | 382/117 |
| 2008/0148069 A1 * | 6/2008 | Tsuria et al. | 713/193 |
| 2008/0201771 A1 * | 8/2008 | Ueda | 726/7 |
| 2010/0310133 A1 * | 12/2010 | Mason et al. | 382/117 |
| 2011/0007949 A1 * | 1/2011 | Hanna et al. | 382/107 |
| 2011/0022847 A1 * | 1/2011 | Duffy et al. | 713/179 |
| 2011/0228989 A1 * | 9/2011 | Burton | 382/116 |
| 2012/0102332 A1 * | 4/2012 | Mullin | 713/186 |

FOREIGN PATENT DOCUMENTS

WO    WO 2007/017207 A1    2/2007

OTHER PUBLICATIONS

John Daugman, "How Iris Recognition Works" (University of Cambridge; www.CL.cam.u.c.uk/users/igd1000/).

Feng Hao et al., "Combining Cryptography with Biometrics Effectively" (University of Cambridge, Technical Report, No. 640, XP009072846, Jul. 2005).

Mayumi Kaida et al., "Usefullness of New Retinal Projection System as a Low-Vision Aid" (Abstract, INIST-CNRS, 2006; http://cat.inist.fr/?aModele=afficheN&cpsidt=16272796).

Leslie Katz, "Is That a Movie Screen on Your Head" (CNET News.com, Jun. 28, 2005; webpage: http://news.com/2061-10801_3-5766992.html).

Simon Liu et al., "A Practical Guide to Biometric Security Technology" (webpage: www.findbiometrics.com/Pages/lead.html).

Candice Lombardi, "Can You See Me Now?" (Dec. 20, 2006; webpage: http://crave.cnet.com/8301-1_105-9669720-1.html).

Bostjan Marusic et al., TIRAMISU: A Novel Approach to Content Representation and Key Management for Seamless Super-Distribution of Protected Media (Signal Processing: Image Communication 20 (2005) 947-971).

Umut Uludag et al., "Biometric Cryptosystems: Issues and Challenges" (Proceedings of the IEEE, vol. 92, No. 6, Jun. 2004; XP-11112757).

Meihua Wang et al., "A Novel Digital Content Protection Scheme Combining Iris Identity Based Digital Signature and Semi-Fragile Watermark" (Intl Conference on Communications Technology, Nov. 2006).

Iridian Technologies:Products (Indian Technologies, Inc.; webpage: www.iridiantech.com/products.php).

"Iris and Retinal Identification" (webpage: http://et.wcu.edu/aidc/BioWebPages/Biometrics_Eye.html).

"Irispass-M Product specification" (Oki Electric Industry Co., Ltd., 2006; printed from webpage: www.oki.com/jp/FSC/iris/en).

"Iris Reader BM-ET330" (product description, Panasonic).

"Iris Recognition" (Wikipedia, Aug. 21, 2006; webpage, http://en.wikipedia.org/w/index.php?title=Iris_recognition&printable=yes).

"Iris Recognition Biometrics Vendors and Solutions" (found at http://www.findbiometrics.com/tech-showcases/viewshowcase.php?showcase id=10).

"Nomad Expert Technician system-Clear Advantages for the Automotive Industry" (Microvision, Inc.).

Nomad—Expert Technician System:FAQ (Microvision, Inc., 2005; http://webarchive.org/web/20060216060330/http://www.mvis.com/_nomadexpert/fag.html).

"Nomad Expert Technician System—Display Features and Benefits" (Microvision, Inc., 2004).

"Nomad Expert Technician System-Wearable Computer Features and Benefits" (Microvision, Inc., 2004).

"Retinal Display Projects Imagery Directly Into Human Eye" (SPIE—The International Society for Optical Engineering, 2000; webpage: www.spie.org/web/oer/september/sep97/Retinal.html).

"Retinal Scan" (Wikipedia, Aug. 9, 2006; webpage, http://en.wikipedia.org/w/index.php?title=Retinal_scan&printable=yes).

"Special Technologies" (Geo Data Systems Management Inc.; (webpage: www.geodatasys.com/tech.htm).

"Vestibuloocular Reflex (VOR) From the Labyrinth to the Cortex" (webpage: www.egms.de/egms/servlet/Fidure?id=cto000011&Figure=f1&vol=2005-4).

Nov. 3, 2011 Office Communication in connection with prosecution of GB 100 0304.4.

* cited by examiner

METHOD AND APPARATUS FOR USER AUTHENTICATION BASED ON A USER EYE CHARACTERISTIC

FIELD OF THE INVENTION

The present invention relates generally to entertainment delivery systems and specifically to cryptographically protected entertainment delivery systems.

BACKGROUND OF THE INVENTION

U.S. Pat. No. 6,363,485, entitled MULTI-FACTOR BIOMETRIC AUTHENTICATING DEVICE AND METHOD, describes "A multi-factor biometric authenticating device and method generates error correction based partial encryption key seed data based on a plurality of sample biometric inputs, such as raw biometric data The error correction based partial encryption key seed data serves as a partial seed for generating a secret encryption key for encrypting user data. The first partial seed is combined with a second partial encryption seed to generate the secret encryption key. The device stores the error correction based partial encryption key seed data and does not store the secret encryption key."

U.S. Pat. No. 6,038,315, entitled METHOD AND SYSTEM FOR NORMALIZING BIOMETRIC VARIATIONS TO AUTHENTICATE USERS FROM A PUBLIC DATABASE AND THAT ENSURES INDIVIDUAL BIOMETRIC DATA PRIVACY, describes "A password system comprises a set of code words spaced apart from one another by a Hamming distance (HD) that exceeds twice the variability that can be projected for a series of biometric measurements for a particular individual and that is less than the HD that can be encountered between two individuals. To enroll an individual, a biometric measurement is taken and exclusive-ORed with a random codeword to produce a "reference value." To verify the individual later, a biometric measurement is taken and exclusive-ORed with the reference value to reproduce the original random codeword or its approximation. If the reproduced value is not a codeword, the nearest codeword to it is found, and the bits that were corrected to produce the codeword to it is found, and the bits that were corrected to produce the codeword are also toggled in the biometric measurement taken and the codeword generated during enrollment. The correction scheme can be implemented by any conventional error correction code such as Reed-Muller code R(m,n). In the implementation using a hand geometry device an R(2,5) code has been used in this invention. Such codeword and biometric measurement can then be used to see if the individual is an authorized user. Conventional Diffie-Hellman public key encryption schemes and hashing procedures can then be used to secure the communications lines carrying the biometric information and to secure the database of authorized users."

U.S. Pat. No. 6,957,337, entitled METHOD AND APPARATUS FOR SECURE AUTHORIZATION AND IDENTIFICATION USING BIOMETRICS WITHOUT PRIVACY INVASION, describes "A method and apparatus for authenticating (or identifying) a subject, includes using one or a plurality of biometric measurements for authentication (or identification) without any sharing of the subject's biometric data with a party requesting authentication."

Published US Patent Application No. 20030091218A1, entitled METHOD OF HASH STRING EXTRACTION, describes "A method of hash string extraction from biometric information . . . . The method comprises the steps of providing a biometric information sample in the form of a fingerprint for example, extracting features from the biometric information sample and encoding the features based on their location within the biometric information sample; and, generating a string of values based on the extracted features and their determined locations. The method further comprises the steps of hashing the string of symbols to produce a plurality of hash values for comparing the plurality of hash values against a stored hash value for identifying a user."

Published US Patent Application No. 20030089764A1, entitled CREATING COUNTERFEIT-RESISTANT SELF-AUTHENTICATING DOCUMENTS USING CRYPTOGRAPHIC AND BIOMETRIC TECHNIQUES, describes "a system and method for creating and verifying physical documents and/or smart cards based upon positively identifying the owner, holder, or presenter of the document by relating to the measurement of biometric data of the individual at the time of document and/or smart card creation and verification. The biometric data that can be included in the creation of the document include retinal scan, face print, fingerprint, voiceprint and DNA profiles, or other viable biometric data set. Also, protected data that includes important information of the document itself that is written on the document, is combined with the biometric data to provide a security data block that is printed on the document. This security data block is decoded by a document verifier when presented by a document presenter, to provide for an enhanced level of document protection and identity protection."

Published PCT Application No. WO9933219A1, entitled ADMINISTRATION AND UTILIZATION OF PRIVATE KEYS IN A NETWORKED ENVIRONMENT, describes the following technology: "In a public key cryptosystem, the private keys of users, as encrypted with a symmetric algorithm by using individual user identifying keys, are stored at the server end along with the users' respective public keys. The server uses an ID of a user transmitted to it from user equipment to read the stored encrypted private key and the public key of the user. The encrypted private key is then transmitted via the network to the user equipment and, locally, at the user equipment the received encrypted private key is decrypted using the user identifying key. The user identifying key may be determined at the user equipment by hashing either the user's pass phrase, which is entered by the user, or the user's biometric information (fingerprint, voice print, retina scan, or face scan). The private key is sent to the user equipment only when needed and, after use, the private key and user identifying key are not retained at the user equipment."

The disclosures of all publications and patent documents mentioned in the specification, and of the publications and patent documents cited therein directly or indirectly, are hereby incorporated by reference.

SUMMARY OF THE INVENTION

Devices which provide direct retinal projection are known. Nomad (registered trademark) is a wearable, head-up, hands free expert technician system available from Microvision, Inc., Bothell, Wash. 98041 USA which creates an image using scanned-beam technology and optically guides the image directly into the user's eye.

Scanners of human eye characteristics are known to be useful in identifying and authenticating people, e.g. as described in the following link: www.findbiometrics.com/Pages/lead.html: "The security field uses . . . biometric(s) . . . . Common physical biometrics include . . . retina, iris, or facial characteristics . . . . A retina-based biometric involves analyzing the layer of blood vessels situated at the back of the eye. An established technology, this technique involves using a low-intensity light source through an optical coupler to scan the unique patterns of the retina. Retinal scanning can be quite accurate but does require the user to look into a receptacle and focus on a given point. This is not particularly convenient if you wear glasses or are concerned about having close contact with the reading device. For these reasons, retinal scanning is not warmly accepted by all users, even though the technology itself can work well .... An iris-based biometric, on the other hand, involves analyzing features found in the colored ring of tissue that surrounds the pupil. Iris scanning, undoubtedly the less intrusive of the eye-related biometrics, uses a fairly conventional camera element and requires no close contact between the user and the reader. In addition, it has the potential for higher than average template-matching performance. Iris biometrics work with glasses in place and is one of the few devices that can work well in identification mode. Ease of use and system integration have not traditionally been strong points with iris scanning devices, but you can expect improvements in these areas as new products emerge."

The following link: et.wcu.edu/aidc/BioWebPages/Biometrics_Eye.html describes existing eye recognition technology as follows:

"Research into eye recognition technology has occurred since 1935. It was during that year an article appeared in the New York State Journal of Medicine that suggested that the pattern of blood vessels on the retina could be used to identify an individual (Computer Business Review, 1998). Since 1935, extensive research and development has gone into establishing iris and retinal patterns and the uniqueness of them.

"It has been well documented the uniqueness of eye identification. The iris is so unique that no two irises are alike, even among identical twins, in the entire human population. In actuality, identifying the iris and converting it to mathematical code, the probability that two irises will produce the same mathematical code is approximately one in ten to the 78th power. The population of the earth is approximately ten to the tenth power (Iriscan, 1999).

"The concept of a system that is able to identify an individual based on their iris was developed in America as well as Britain. The key individuals in bringing this concept to reality were Leonard Flom and Aran Safir, two ophthalmologists. The development of the actual iris scanning technology is credited to Dr. John Daugman. Dr. John Daugman is the man responsible for the creation of the mathematical (algorithms) formulas used to measure the varying characteristics of one's iris. These mathematical formulas were patented by Dr. John Daugman at Cambridge University in 1994 (The Economist, 1998).

"In the iris alone, there are over 400 distinguishing characteristics, or Degrees of Freedom (DOF), that can be quantified and used to identify an individual (Daugman, J. & Williams, G. O. 1992). Although, approximately 260 of those are used or captured in a "live" iris identification application. These identifiable characteristics include: contraction furrows, striations, pits, collagenous fibers, filaments, crypts (darkened areas on the iris), serpentine vasculature, rings, and freckles. Due to these unique characteristics, the iris has six times more distinct identifiable features than a fingerprint.

"The iris is a robust method of identification since the iris remains unchanged throughout one's life and is not suspect to wear and injury.

"Retinal scan identification is based on the blood vessel pattern(s) found on the back of the retina in one's eye. The first retinal commercial product, EyeDentify 7.5, appeared in 1985 (Computer Business Review, 1998).

"In identifying one's iris, there are two types of methods that are used by iris identification systems: passive and active.

"The active iris system requires the user to move back and forth so that the camera can adjust and focus in on the user's iris. The active iris system method requires that a user be anywhere from six to 14 inches away from the camera. The passive iris system is different in that it incorporates a series of cameras that locate and focus on the iris. The passive iris system allows the user to be anywhere from one to three feet away from the camera(s). This method provides for a much more user-friendly experience (International Biometric Group, 1999).

"Actual iris identification can be broken down into four fundamental steps. First, a person stands in front of the iris identification system, generally between one and three feet away, while a wide angle camera computes the position of their eye. A second camera zooms in on the eye and takes a black and white image. After the iris system has one's iris in focus, it overlays a circular grid (zone's of analysis) on the image of the iris and identifies where areas of light and dark fall. The purpose of overlaying the grid is so that the iris system can recognize a pattern within the iris and to generate 'points' within the pattern into an 'eyeprint'. Finally, the captured image or 'eyeprint' is checked against a previously stored 'reference template' in the database.

"The time it takes for a iris system to identify your iris is approximately two seconds. A template iris pattern code contains between 256 and 512 bytes of data depending upon the manufacturer. This small 'template' provides for instant identification and provides a definite advantage when it comes to database searches and archives. As a result of this small "electronic footprint", up to 100,000 records a second can be scanned using a standard personal computer. Furthermore, the mismatch rate is less than one in 100,000 (The Economist, 1998).

"Retinal scans involve a low-intensity infrared light that is projected through to the back of the eye and onto the retina. Infrared light is used due to the fact that the blood vessels on the retina absorb the infrared light faster than surrounding eye tissue(s). The infrared light with the retinal pattern is reflected back to a video camera. The video camera captures the retinal pattern and converts it into data that is 35 bytes in size (Industry Information: Biometrics, 1996)."

A preferred embodiment of the present invention seeks to transmit video entertainment from a 'base station' straight to a viewer's eyes using retinal projection.

Another preferred embodiment of the present invention seeks to use biometric characteristics for creating cryptographic keys for protection of content such as entertainment content.

Another preferred embodiment of the present invention seeks to provide an entertainment system having both a privacy functionality and a content protection functionality. The privacy functionality typically allows content owned by a user content to be transmitted only to his eyes. The content protection functionality typically allows content to be 'broadcast' to only those who are entitled to watch it or otherwise consume it.

Another preferred embodiment of the present invention uses retinal parameters to create an entertainment content-protection system.

Another preferred embodiment of the present invention seeks to provide a combined retinal scanner and projector in a single, secure, typically wearable device also termed herein an "RSP". Based on a user's unique retinal parameters, the RSP typically generates a unique private key for the user, R-K. The R-K key is typically not kept in the RSP; rather it is computed each time that the user employs the device, but for the same user R-K is, preferably, always the same. Based on R-K, the device may compute a Public key, R-Kpub. The content may be protected by the content's key, Ck. Before the content is transmitted to the RSP, the Ck, encrypted by R-Kpub, may be transmitted to the RSP thereby to ensure that only individuals entitled to view the content are able to do so. Typically, the system provides anyone authorized to view the content with Ck encrypted with their individual R-Kpub.

There is thus provided, in accordance with a preferred embodiment of the present invention, an information delivery device interacting with an eye including a retina, the device comprising an eye characteristic reader for reading at least one characteristic of the eye, a retinal projector for projecting information onto the eye's retina, and an eye characteristic processor operative to receive said at least one characteristic of the eye from said reader and to provide said information to said projector accordingly.

Further in accordance with a preferred embodiment of the present invention, at least one characteristic of the eye is received by the eye characteristic processor from the eye characteristic reader and is immediately, without storing, processed.

Also provided, in accordance with another preferred embodiment of the present invention, is a content protection system comprising a multiplicity of eye characteristic readers for reading at least one characteristic of the respective eyes of a user population, and a content protector receiving said at least one characteristic from said readers and controlling the user population's use of content to be protected based on said at least one characteristic.

Further provided, in accordance with yet another preferred embodiment of the present invention, is a biometric content protection system comprising a content database storing a plurality of content items, and a content provider operative to deliver at least one content item to at least one individual user, encrypted based on said user's biometric data.

Still further in accordance with a preferred embodiment of the present invention, the content provider comprises an eye characteristic reader for reading at least one characteristic of the eye, a content key provider operative to provide to at least one user, at least one content key encrypted based on at least one characteristic of the user's eye read by said eye characteristic reader, and an encrypted content item provider providing to the user, at least one content item encrypted using said content key.

Also provided, in accordance with a preferred embodiment of the present invention, is a user authentication method comprising projecting at least one frame onto a user's iris, generating and storing an image of the frame projected onto the user's iris, and on at least one future occasion, generating a new image of the user's iris while projecting at least one of the same frames onto the iris, comparing said new image to said stored image and treating said user as authenticated if the new and stored images are deemed identical.

Further in accordance with a preferred embodiment of the present invention, the characteristic comprises at least one of the following: a retina characteristic; and an iris characteristic.

Still further in accordance with a preferred embodiment of the present invention, the plurality of content items include at least one entertainment content item.

Further in accordance with a preferred embodiment of the present invention, the entertainment content item comprises video content.

Still further in accordance with a preferred embodiment of the present invention, the eye characteristic processor comprises a user authenticator operative to authenticate users on the basis of said at least one characteristic of the eye and wherein said eye characteristic processor is operative to provide information for projection onto a user's retina only if the user has been authenticated.

Additionally in accordance with a preferred embodiment of the present invention, the system also comprises a retinal projector operative to project content items onto an individual user's retina.

Further in accordance with a preferred embodiment of the present invention, the projecting, generating and storing are performed so as to prevent the user from capturing said at least one frame.

Also provided, in accordance with yet another preferred embodiment of the present invention, is an information delivery method interacting with an eye including a retina, the method comprising reading at least one characteristic of the eye, and receiving said at least one characteristic of the eye and, accordingly, providing said information for projection onto the eye's retina.

Further provided, in accordance with another preferred embodiment of the present invention, is a content protection method comprising reading at least one characteristic of the respective eyes of a user population, and receiving said at least one characteristic from said readers and controlling the user population's use of content to be protected based on said at least one characteristic.

Also provided, in accordance with another preferred embodiment of the present invention, is a method for biometric content protection comprising providing a content database storing a plurality of content items, and delivering at least one individual content item to at least one individual user, encrypted based on said user's biometric data.

Further provided, in accordance with another preferred embodiment of the present invention, is a user authentication system comprising an iris projector projecting at least one frame onto a user's iris, an authentication image generator generating and storing an image of the frame projected onto the user's iris, and an authenticator operative to generate a new image of the user's iris while projecting said at least one frame onto the iris, to compare said new image to said stored image and to treat said user as authenticated if the new and stored images are deemed identical.

Still further in accordance with a preferred embodiment of the present invention, the step of delivering at least one individual content item encrypted based on said individual user's biometric data comprises encrypting the individual content item using a content key, receiving a biometric key generated from biometric data characterizing the individual user, and delivering to the user: (a) the content item encrypted using the content key, and (b) the content key itself, encrypted using said biometric key.

Further in accordance with a preferred embodiment of the present invention, the receiving step comprises authenticating users on the basis of said at least one characteristic of the eye and wherein information is projected onto a user's retina only if the user has been authenticated.

Still further in accordance with a preferred embodiment of the present invention, the system also comprises a wearable content receiver operative to receive from said content provider a content key, encrypted based on at least one characteristic of a user's eye, and a content item encrypted using said content key, to decrypt said content key based on at least one characteristic of a user's eye, to decrypt said content item using said decrypted content key, and to project said content item toward the user's eyes for viewing.

Further in accordance with a preferred embodiment of the present invention, the content key is encrypted and decrypted using a public key-private key pair based on at least one characteristic of the user's eye.

Still further in accordance with a preferred embodiment of the present invention, the biometric key comprises a public key.

Further in accordance with a preferred embodiment of the present invention, the biometric key comprises a subset of biometric information, the subset being selected by use of a hash function, wherein the content key is expanded to include error correction code and is then encrypted by XORing it with the biometric key.

Still further in accordance with a preferred embodiment of the present invention, the content key is encrypted and decrypted using a subset of biometric information, the subset being selected by use of a hash function, the biometric information being based on at least one characteristic of the user's eye, and wherein the content key is expanded to include error correction code and is then encrypted by XORing it with the biometric key.

Further in accordance with a preferred embodiment of the present invention, the public key-private key pair is formed from a seed comprising a concatenation of at least a most significant portion of at least one digital eye characteristic.

BRIEF DESCRIPTION OF THE DRAWINGS

Preferred embodiments of the present invention are illustrated in the following drawings.

DETAILED DESCRIPTION OF PREFERRED EMBODIMENTS

Figure 1:
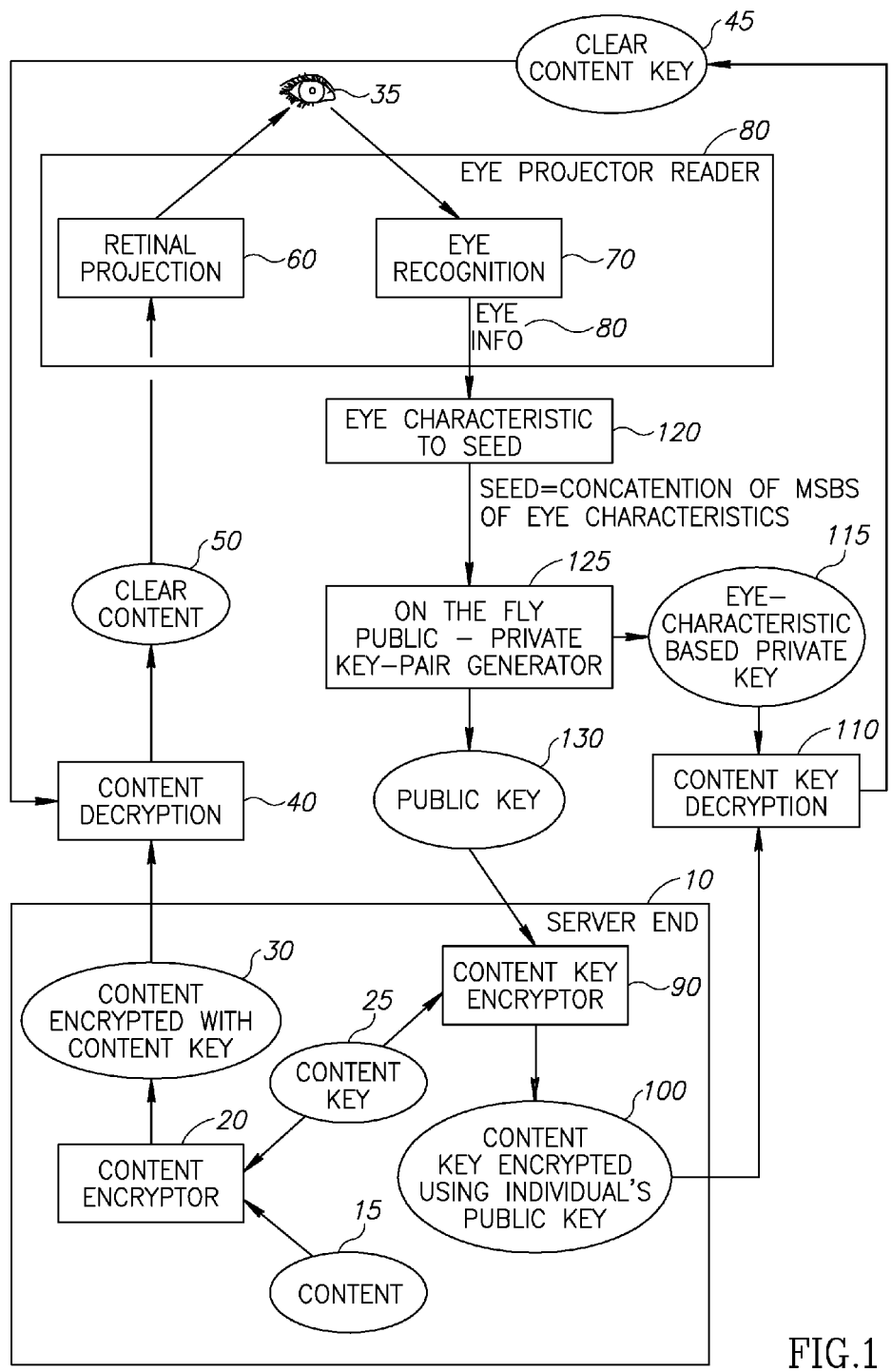
FIG. 1 is a simplified functional block diagram illustration of a retinal entertainment providing system constructed and operative in accordance with a first embodiment of the present invention.

Reference is now made to FIG. 1 which is a simplified functional block diagram illustration of a retinal entertainment providing system constructed and operative in accordance with a preferred embodiment of the present invention. Typically, the system has a server end as indicated by rectangle 10, the remaining system components typically being located at each of a multiplicity of user premises. As shown, the system typically provides content 15 to a content encryptor 20 which may use a cryptographic key 25, typically randomly generated, and employ any suitable encryption technology such as but not limited to AES encryption, to encrypt the content 15. The encrypted content 30 is transmitted, typically by broadcast, to a user whose eye is indicated by reference numeral 35. The user decrypts the content, using a content key 45, thereby to obtain clear content 50 which is then projected onto the user's retina by retinal projection system 60. Retinal projection system 60, as well as an eye recognition system 70, may be mounted on a typically wearable e.g. head-mountable projector-eye reader device, also termed herein "eye projector reader device 80", which may be based on known technologies such as the wearable display device ("video glasses with light-guide optical element") technologies of Lumus Ltd. Rehovot, Israel e.g. as described in their website at lumusvision.com and patent documents, or the Nomad display device technology of Microvision, Inc., Bothell, Wash., USA, as described in their website and patent documents, or Scalar's Teleglass eyewear. Typically, the eye projector-reader 80 is 1-2 inches from the eye and the retinal projection system 60 has an 'auto focus' capacity.

Retinal projection system 60 is operative to project information onto the retina. Eye recognition system 70 is operative to scan at least a portion of an eye 35 and to generate biometric digital information characterizing at least a portion of the eye such as the retina or iris thereof.

Systems 60 and 70 and, optionally, associated optical fibers, may be mounted on or inside the handles of a conventional spectacles- or goggles-like frame. Or, either or both of the systems and, optionally, associated optical fibers, may be mounted on a flip-out device which is flipped into the user's field of view when it is desired to use, say, the eye recognition system, and out of the user's field of view when use is terminated.

It is apparent that cryptographic key 25 is, in accordance with the illustrated embodiment, conveyed to the user in the sense that key 45 on the user's premises needs to be identical to key 25 at the server end. To effect this, a public key belonging to the user may be employed to encrypt the content key 25 using any conventional encryption scheme 90 such as RSA. The resulting encrypted content key 100 is conveyed to the user and is typically decrypted on the user's premises using a decryption scheme 110 which matches encryption scheme 90. The input to the decryption scheme typically includes the user's private key 115. This is typically not stored and instead is typically generated or re-generated in the consumer's device for each use and then immediately used by an eye characteristic-to-seed module 120 in conjunction with an eye-recognition based public-key/private-key pair generator 125 which receive eye characteristics of the user, such as retina or iris characteristics, from eye recognition module 70, generate a seed from the eye characteristics, and generate a private key 115 from the seed. The key pair generator 125 also generates the user's public key 130 which is typically not considered secret and can be posted on a virtual bulletin board, transmitted in the clear or otherwise openly conveyed to the server, for use by the server end's content key encryptor 90. An article by John Daugman entitled "How iris recognition works" describes characteristics including a bit vector which may consist of 2000 bits. Two different measurements of the same iris may produce two non-identical bit vectors. There is typically a relative offset between the two vectors and once they are aligned, two corresponding bits are the same with high probability. The relative offset is a product of camera and/or eye rotation between the two iris scans. The probability of two corresponding bits being the same may be a function of illumination, camera focus, and lens inter alia.

The seed of the private key 115 may be based on, say, 35 bytes or may be of any other suitable size. Optimally, the process whereby the seed is generated from one, some or many measured eye characteristics is error-resistant, such that the same seed is derived even if eye measurements vary. One way to approach this is to select a set of eye characteristics, typically including many eye characteristics such as between 10 and 100 some, each or most of which differ more widely between individuals than they do between measurements for the same individual. Each of those characteristics may, for example, be measured in a range of 0 to 255, i.e. a one byte value 0x00 to 0xFF. The highest nibble of these values are then concatenated together in a predefined order. For example, for 70 characteristics of value 0xFE12, 0x394A, 0x7B03, 0xA321, . . . the concatenated seed may be FE39 7BA3 . . . . More generally, the most significant portion of each of one, several or many eye characteristics, which most significant portion is known to be reliable over measurements and known to vary over the population, is concatenated into a seed for private key 115. For example, the concatenation may comprise some or all of the types of eye information referenced in the article by John Daugman entitled "How iris recognition works", referred to above.

The conversion of the seed into a private/public pair by key pair generator 125 may be effected by any suitable method including standard methods such as conventional RSA key pair generation. For example, conversion may include the following steps:

(a) Create, from the seed provided by eye info to seed module 120, two large prime numbers p and q such that p is not equal to q, randomly and independently of each other.

(b) Compute m=p*q.

(c) Compute the totient phi (n)=(p−1)*(q−1).

(d) Choose an integer e such that 1<e<phi(N) which is co-prime to phi(n).

(e) Compute d such that d*e=1 mod phi(n).

Step (a) may, for example, comprise computing HASH (SEED) thereby to obtain a large number such as a 256 byte number. This number is divided or split into two, e.g. 128 byte long, numbers, and these numbers are used as starting points, using conventional methods, to p and q.

Preferably, the content 15 comprises entertainment content and typically does not contain any biometric data. Typically, biometric data is used only to encrypt/decrypt the content key.

If it is desired to use the asymmetric public/private key approach this can be done without high accuracy measurements of eye characteristics e.g. using the following method: The first time a user has access to the device shown and described herein s/he is directed to undergo a personalization stage in which its public/private key pair is generated. The seed for the asymmetric key generation may be a hash value (e.g. sha-1) of the 2000 bits generated for encoding of the individual's iris information or truly random bits. Once the public/private key pair is generated, the device may update the head-end server with the user's public key. This public key may be used for encryption of the content's encryption key as described above. The private key may then be expanded and encrypted with the 2000 bit iris information used as "fuzzy key". For example, the private key may be divided into several portions each 100 bits long. Each portion may be expanded with forward error correction code, e.g. to 150 bits. A hash function of the portion index may be used to select 150 "fuzzy part key" bits out of the 2000 bits of iris information. The 150 bits of the private key expanded portion bits may then be XORed with the 150 "fuzzy part key" bits. The expanded and encrypted private key may then be stored on the device, or alternatively sent to the head-end server for storage.

For decryption of content, the content key is decrypted. First the expanded encrypted private key may be retrieved either from a device storage or from the head-end. The individual's iris is scanned and the 2000 iris bit information is computed and used for decryption of the private key, which then used for decryption of the content key. The 2000 bits computed from the iris picture may not be aligned with the 2000 bits produced at the first iris scan and used for encryption of the private key. The article by John Daugman entitled "How iris recognition works", referred to above, suggests that several (such as about 10) offsets of the obtained sequence may be tried before correct alignment is achieved. In the present application, the same sequence is used for encryption of a private key and therefore it is not known whether the correct alignment has been achieved or not. A possible solution comprises incorporation of an extra field of 20 bits into the encrypted private key.

Once the private key has been restored, the content of this field may be compared with the first 20 output bits of a hash (e.g. SHA-1) of the private key. If these bits do not agree, a different offset of the 2000 computed iris bits may be tried; this offset sequence may be used for decryption of the private key. This process may be continued until agreement is reached at which point the correct value for the private key may be set. The above process is typically characterized in that iris fuzzy information is used not for creation of the private/public key pair but for encryption and decryption of the private key. Therefore, using fuzzy information and error correcting codes, the same private key may be obtained repeatedly.

Figure 3:
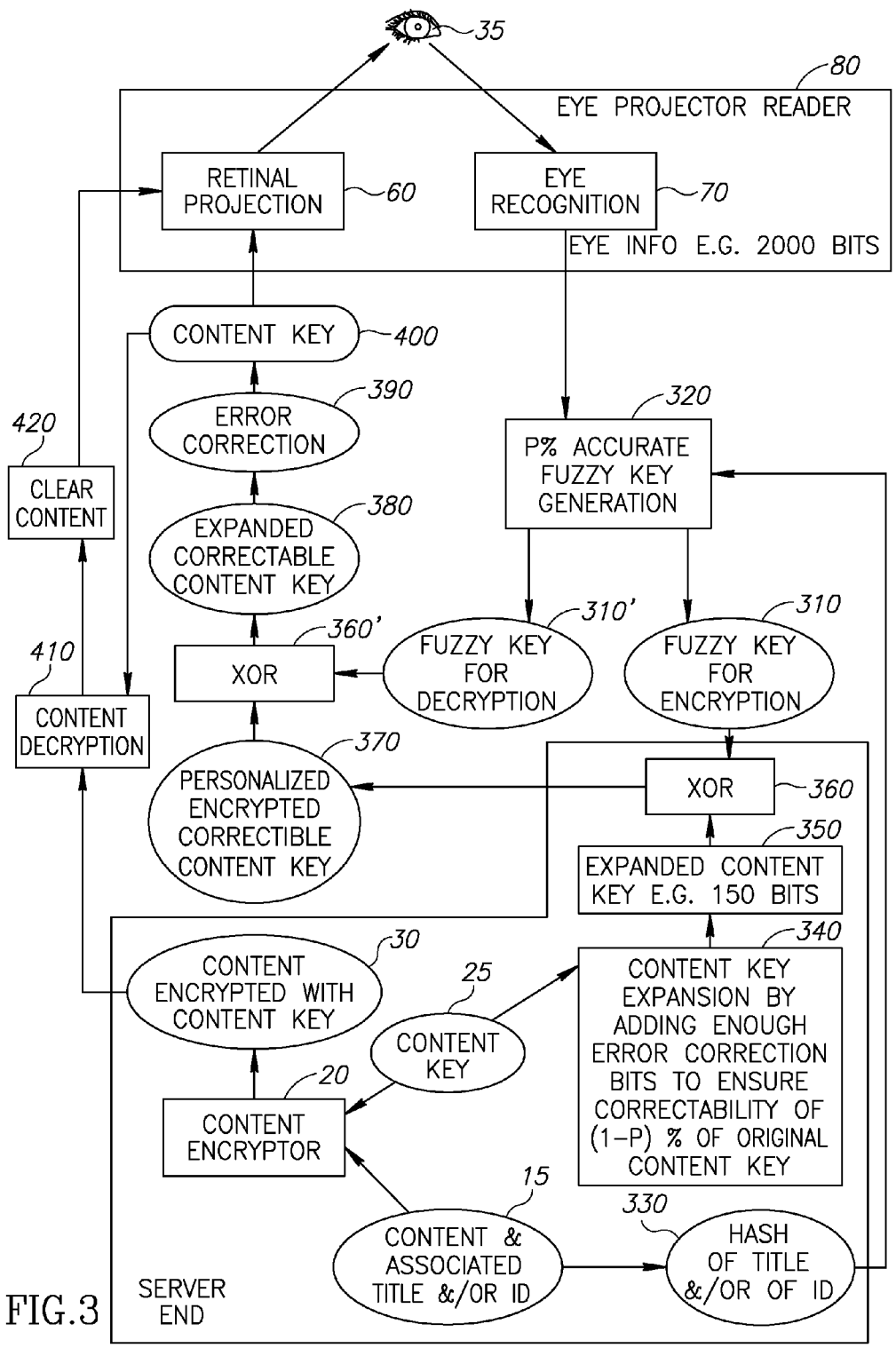
FIG. 3 is a simplified functional block diagram illustration of a retinal entertainment providing system constructed and operative in accordance with a second embodiment of the present invention.

Alternatively, a content key may be generated as shown in FIG. 3: A suitable eye measurement or concatenation of eye measurements from eye recognition unit 70 forms a value having, say, 2000 bits; it being appreciated that numerical values stipulated herein are stipulated merely by way of example and are not intended to be limiting. For any given content item 15 which it is desired to encrypt, a "fuzzy key" 310 is generated (box 320) by selecting a subset of the originally measured value, e.g. by selecting 150 of the original 2000 bits. Selection may be effected by a suitable function such as a hash 330 of the content title or ID. It is appreciated that each time an individual's eye's are measured, the "fuzzy key" 310 may be recomputed, with a known minimum accuracy. U.S. Pat. No. 6,038,315 to Strait et al, entitled "Method and system for normalizing biometric variations to authenticate users from a public database and that ensures individual biometric data privacy", includes a description of a method for computing these bits at an accuracy of perhaps 95%.

The content key 25 is then expanded by a forward error correction code, bit adding box 340, say from an original length of 100 bits to 150 bits, the added bits (50, in this example) being error correction bits that guarantee that an error in up to 5% of the original content key bits is correctable. This process of adding correction bits may follow a suitable error correction method such as Reed-Solomon error correction. The expanded content key 350 may then be XORed at XOR logic unit 360 with the fuzzy key 310 to obtain a personalized, encrypted and expanded content key 370. To access the content 15 using this content key 370, a current eye measurement is generated by eye recognition unit 70 and is used to re-compute the "fuzzy key" 310 to 95% accuracy. The recomputed "fuzzy key", termed herein 310', is then XORed, at XOR logic unit 360' which may or may not coincide with XOR logic unit 360, with the personalized encrypted expanded content key 370, thereby to yield a 150 bit expanded content key 380. The error correction method associated with the error correction code used to expand the original number of bits to (say) 150 bits (e.g.: Reed-Solomon) is then used by error correction unit 390, to retrieve an 100 bit (in the illustrated example) content key 400. Content decryption unit 410 then decrypts the content and the clear content 420 is projected onto the retina of eye 35 by retinal projection device 60.

It is appreciated that the error correction code used for the expanded content key may comprise any suitable conventional error correction approach, such as Reed-Solomon, such that each bit of the error correction portion is a function of many randomly looking bits of the actual content key and each bit of the actual content key is used to compute many of the error correction bits.

To determine the correct offset of the computed 2000 bit sequence of iris information, the method described above may be used, including concatenation of an extra field to the encrypted expanded content key, the field comprising, e.g. the first 20 output bits of a hash function of the content's encryption key. When the content key is recovered the system checks whether it is the correct key. If fields do not match, a different offset of the 2000 bit vector representing the iris information is tried, until a correct content key is found.

The method for encryption of the expanded content key with a "fuzzy key" may provide security of the content keys as long as the content keys are unknown to an attacker and the same content key is never used twice e.g. for encryption of two content pieces of the same user or for encryption of two content pieces of two different users. If these keys become known for some reason it may be possible for an attacker to obtain information pertaining to the 2000 bits comprising the "fuzzy key". To comply with the above characterization the following method may be used by way of example:

a. Select a random bit string of 128 bits.
  b. Concatenate the selected bit string with the content identifier and the user ID.
  c. Compute a hash value of the bit string composed in b.
  d. Select the first 100 output bits to be the content's encryption key.

According to one embodiment of the invention, the server end of the system may comprise one or more computers or other programmable devices, preferably equipped with input devices such as a keyboard and mouse operative to allow operators to provide input to the system as described herein. Each computer may be programmed in accordance with some or all of the apparatus, methods, features and functionalities shown and described herein.

The user and server ends of the invention as shown and described herein may communicate via any conventional wired or wireless digital communication means, optionally via a communication network such as the World Wide Web.

It is appreciated that photographing the eye using a wearable camera as shown in FIG. 1 is only one possible embodiment of the present invention and is not intended to be limiting. Alternatively, for example, a registration process may be required of users. At registration, the would-be user is shown a sequence of frames or images such as a small number of basic images or a movie or a movie with a small number of subliminal basic images. The sequence of images may be projected inside a box similar to boxes conventionally used for iris registration. The user's eye is photographed as it views various of the images thereby to generate images of specific images projected onto specific users' irises. Typically, image projection and photography are carefully synchronized such that it is possible to match images of the user's eye to the images that the user was viewing as his eye was imaged. Each photograph so collected is hashed and a record is created which stores (a) a unique user ID; (b) the ID of the frame viewed by the user; and (c) the image of the user's iris or other eye portion, as he viewed the frame. Alternatively instead of (c), the system may compute and store a seed based on Hash (user id, image id) using any suitable hash function such as SHA-1 or any other suitable hash function.

When it is desired to authenticate the above user, the server end of the system selects one of the frames which the user was shown during registration and sends it to the user end of the system for projection to the user. The user's eye is photographed at the user end while he is viewing the frame and a hash of the image of the user's eye viewing the frame (i.e. of the specific frame projected onto that specific user's iris) or the seed based on hash(user ID, image ID) is computed, either at the user end or at the server end. The server then compares the above hash to the relevant stored hash to determine identicality thereof, thereby to authenticate the user.

Preferably, the user end of the system of FIG. 1 is on-line with the server end 10 when the system of FIG. 1 or a non-wearable variation thereof is in use. If this is the case, the hash function is typically computed at the server (security center) end, the security center having received the image to be hashed from the user end. Alternatively however, e.g. if there is one-way communication between the user and the security center, the hash may be computed at the user end and the resulting hash function may be used to compute a personal key 115 for the user to use during the upcoming session.

Still another method for computing a personal key for encrypting the content key 25 of FIG. 1 is to use the seed computed from the hash(user ID, image ID) as a basis for computing the personal key, using any well-known secure algorithm such as RSA. In this case, there is no need to compute a public/private key pair and the same personal key is computed independently by both sides.

The following steps may be performed on the User Side:
a) compute the SEED=Hash (User ID, Image data). User ID is something that the user knows, whereas image data is obtained from the iris; and
b) compute the Personal Secret=F(Global Secret, SEED), typically in a secure environment such as a smart-card.

The Smart Card may get either the image ID or the SEED, the image ID case typically being more secure.

In the registration process the H/E may get the image data, and may also have the relevant global secret. The global secrets do not have to be truly global and may be any information that both the smart-card and the H/E have. This is useful as a defense against an attack in which a user's projector-reader together with her smart-card were both stolen, because the attacker will not be able to view the content.

The secure algorithm used may or may not be the same for all projector readers. Optionally, to further protect the personal key, a secure device contained within the glasses such as a smart card chip may be used to compute the personal key from the seed. In another alternative, protecting even against theft of the seed, the seed itself may be computed in the secure device by sending the image to that device and based on a secret within that device. Furthermore in a unicast environment, the computed personal key may be used as a content key, and the content may be uniquely encrypted for each user, instead of using the personal key to re-encrypt a content key common to many users.

Optionally, authentication may simply be on the basis of recognition of the user's retina or iris by comparing current images thereof or parameters derived therefrom to previously stored images or parameters of the same retina or iris.

Any suitable hash function may be used to implement the methods and systems shown and described herein, such as an MD5 hash or any other hash function e.g. as described in en.wikipedia.org's article on cryptographic hash functions.

Figure 2:
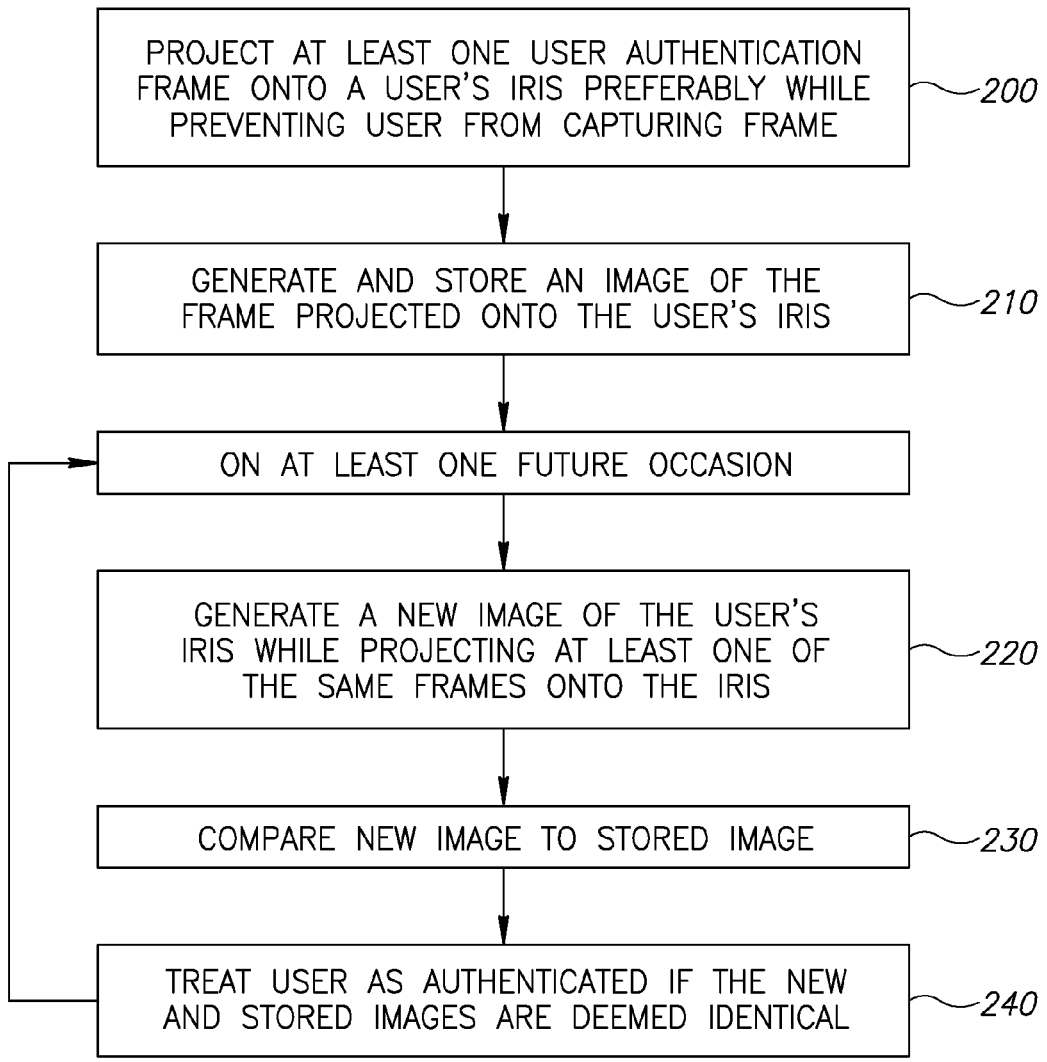
FIG. 2 is a simplified flowchart illustration of a user authentication process operative in accordance with a preferred embodiment of the present invention.

Reference is now made to FIG. 2 which is a simplified flowchart illustration of a user authentication process operative in accordance with a preferred embodiment of the present invention, preferably in conjunction with the system of FIG. 1. The user authentication method of FIG. 2 preferably includes projecting at least one frame onto a user's iris (step 200), and generating and storing an image of the frame projected onto the user's iris (step 210). This image is then used to authenticate the user on at least one future occasion. On each such occasion, a new image of the user's iris is generated while projecting at least one of the same frames onto the iris (step 220), the new image is compared to the stored image (step 230) and the user is treated as authenticated (i.e. is provided with an entertainment item earmarked for him only) if and only if the new and stored images are deemed identical (step 240) using a conventional function for computing distance between the two images, or a difference image, and using a selected distance threshold to determine identicality.

A particular feature of a preferred embodiment of the present invention is that biometric characteristics of intended users are used to control access to encrypted content, e.g. content to be viewed by a user, thereby to selectively protect that content by selectively allowing only the intended users to use the content since users other than the intended users will not be capable of decrypting the content. Typically, the biometric characteristic-based encryption of the content comprises using biometric characteristics to generate a public key-private key pair, giving a user the content encrypted with a content key, and also giving the user the content key, encrypted with the biometric characteristic-based public key, thereby to prevent decryption of, and consequently use of, the content by any user other than the user to which the public key-private key pair uniquely belongs.

It is appreciated that the many embodiments of the present invention are possible, including but not limited to the following:

a. Each user is pre-registered. During the pre-registration process, the user's biometric characteristic based public key becomes available to the server end 10 of the apparatus of FIG. 1. To obtain content, the user professes an identity and requests certain content and the server 10 sends the user (a) the content requested, encrypted using a content key; and (b) the content key, encrypted using the public key corresponding to the user's professed identity. If the user's professed identity is false, s/he will not be able to use the requested content because s/he does not possess the private key which matches the public key used to encrypt the content key.

b. Each user is pre-registered. During the pre-registration process, the user's biometric characteristic based public key becomes available to the server end 10 of the apparatus of FIG. 1. To obtain content, the user sends the server 10 a request for specific content, accompanied with his or her public key. The server 10 compares the public key as received from the user to at least the user's public key as stored in the system; if the two are not identical or if no such public key is stored in the system, the server typically does not send any content. If the public key presented by the user matches the user's public key as stored at the server end, the server 10 sends the user (a) the content requested, encrypted using a content key; and (b) the content key, encrypted using the public key provided by the user. If the user has sent in a public key belonging to another, s/he will not be able to use the requested content because s/he does not possess the private key which matches the public key used to encrypt the content key.

c. No pre-registration occurs. To obtain content, the user sends the server 10 a request for specific content accompanied by his biometric characteristic based public key, and typically pays for that content. Server 10 sends the user (a) the content requested, encrypted using a content key; and (b) the content key, encrypted using the public key provided by the user. If the public key sent by the user was not derived from his own biometric characteristics, the private key generated by unit 125 in FIG. 1 will not succeed in decrypting the content key, because it will not match the public key used to encrypt the content key.

d. Content may be stored by the user on the "eye projector reader device 80" or an extension thereof, such as a memory device which connects to the eye projector reader device 80 via a USB port. This content will be stored with the original encryption and encrypted content key. The only difference between the process for accessing this content and the process described above for accessing content received directly from the server is that the original steps of informing the server of the user public key and transferring content are done at an earlier stage.

It is appreciated that software components of the present invention including programs and data may, if desired, be implemented in ROM (read only memory) form including but not limited to EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A user authentication method comprising:
projecting at least one frame onto a user's iris;
generating and storing an image of the frame projected onto the user's iris; and
on at least one future occasion, generating a new image of the user's iris while projecting at least one of the same frames onto the iris, comparing said new image to said stored image, and authenticating said user if the new and stored images are deemed identical.

2. The method according to claim 1 wherein said projecting, generating, and storing are performed so as to prevent the user from capturing said at least one frame.

3. The method according to claim 1 wherein said at least one frame comprises at least a portion of a movie.

4. A method according to claim 1 further comprising:
computing a personal key for obtaining a content key, the computing comprising:
computing a seed based, at least in part, on: a user ID; and
the new image; and
using the seed to compute the personal key.

5. The method according to claim 4 wherein the personal key is computed using the seed based, at least in part, on an RSA method.

6. The method according to claim 1 further including projecting a movie on said user's retina if said user is authenticated.

7. The method according to claim 1 further comprising:
providing an eye projector reader device, wherein at least the projecting, the generating an image, and the generating a new image are performed by the eye projector reader device.

8. Apparatus comprising:
an eye projector reader device operative to:
project at least one frame onto a user's iris;
generate and store an image of the frame projected onto the user's iris; and
on at least one future occasion, generate a new image of the user's iris while projecting at least one of the same frames onto the iris, compare said new image to said stored image, and authenticating said user if the new and stored images are deemed identical.

9. The apparatus according to claim 8 wherein said at least one frame comprises at least a portion of a movie.

10. The apparatus according to claim 8 wherein the eye projector reader device is also operative to:
compute a personal key for obtaining a content key, the computing comprising:
computing a seed based, at least in part, on: a user ID; and
the new image; and
using the seed to compute the personal key.

11. The apparatus according to claim 10 wherein the personal key is computed using the seed based, at least in part, on an RSA method.

12. The apparatus according to claim 8 wherein the eye projector reader device projects a movie on said user's retina if said user is authenticated.

* * * * *

UNITED STATES PATENT AND TRADEMARK OFFICE
CERTIFICATE OF CORRECTION

| | | |
|---|---|---|
| PATENT NO. | : 8,347,106 B2 | |
| APPLICATION NO. | : 12/452262 | |
| DATED | : January 1, 2013 | |
| INVENTOR(S) | : Tsuria et al. | |

It is certified that error appears in the above-identified patent and that said Letters Patent is hereby corrected as shown below:

Add the following in Col. 1 immediately after the Title and immediately before the heading FIELD OF THE INVENTION:

--RELATED APPLICATION INFORMATION
The present application is a 35 USC §371 application of PCT International Patent Application PCT/IB2008/050208, which was filed on 21 January 2008 and titled "CONTENT DELIVERY SYSTEM", which was published in the English language on 8 January 2009 (corrected version published 23 April 2009) with publication number WO 2009/004498, and which claims priority from Israel Patent Application No. 184399 filed 3 July 2007.--

Signed and Sealed this
Twelfth Day of March, 2013

Teresa Stanek Rea
*Acting Director of the United States Patent and Trademark Office*